UNITED STATES PATENT OFFICE.

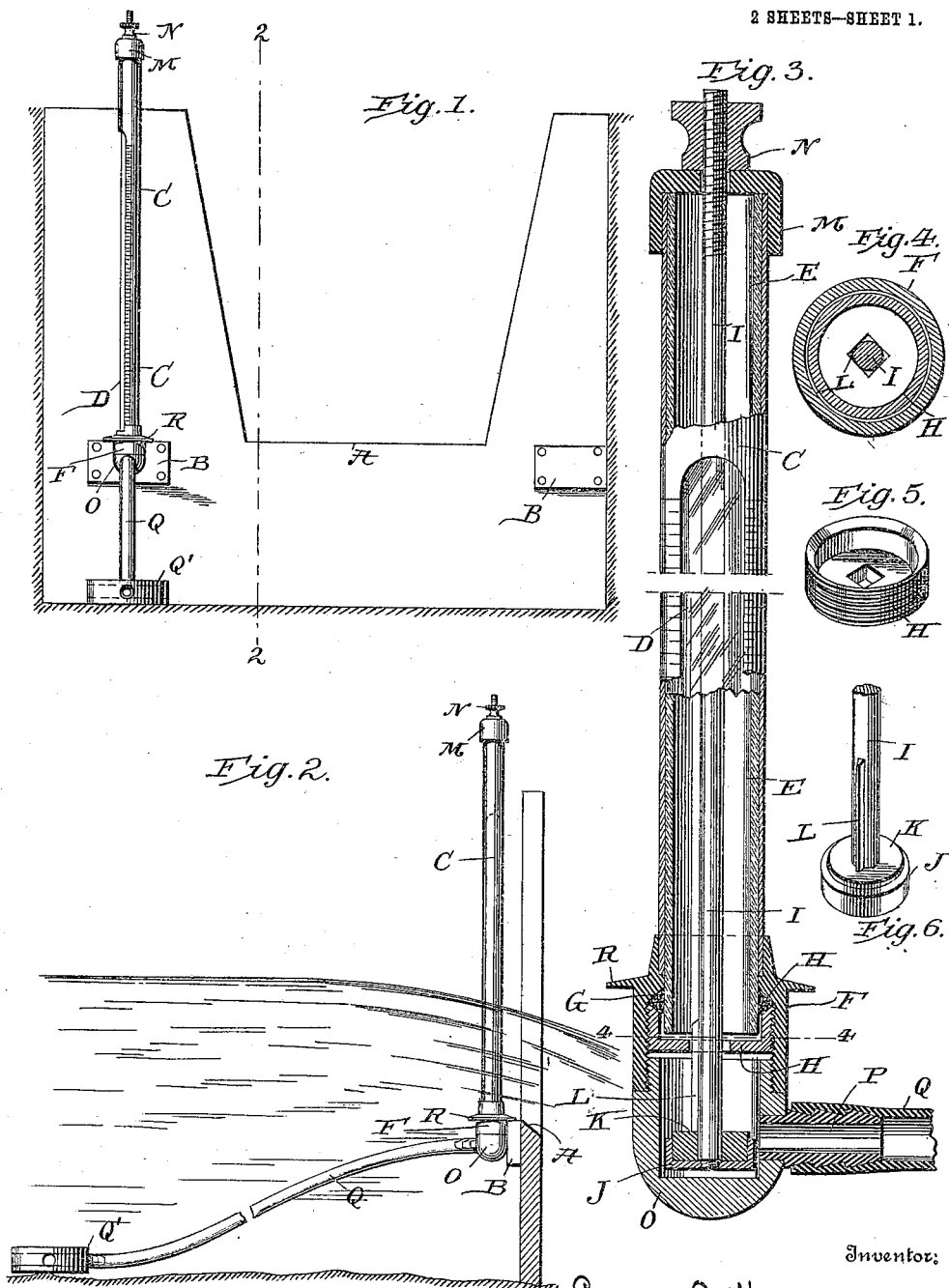

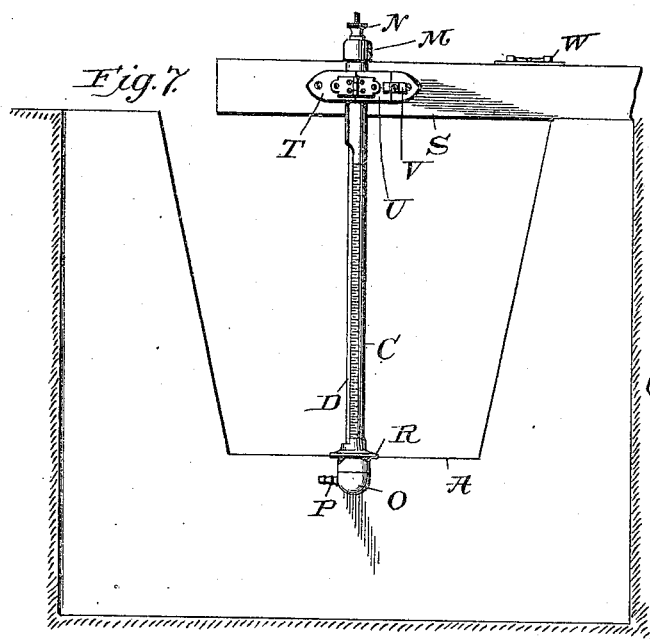
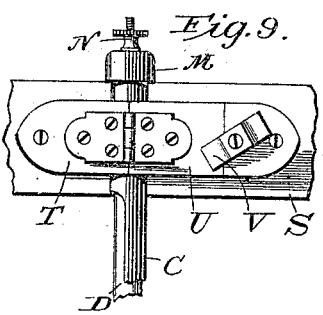
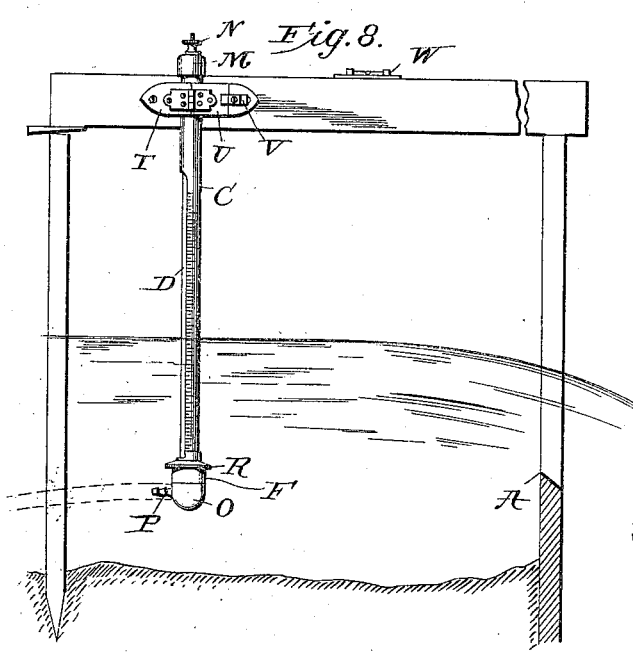
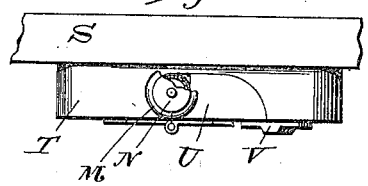
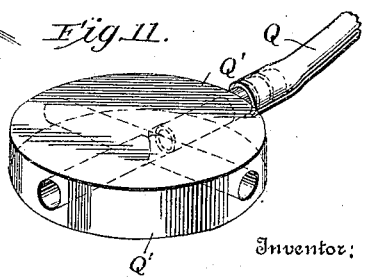

EDWARD B. HOWELL, OF BUTTE, MONTANA.

GAGE.

963,150.
Specification of Letters Patent.
Patented July 5, 1910.

Application filed January 14, 1909. Serial No. 472,285.

*To all whom it may concern:*

Be it known that I, EDWARD B. HOWELL, a citizen of the United States, residing at Butte, in the county of Silverbow and State of Montana, have invented certain new and useful Improvements in Gages, of which the following is a specification.

My present invention pertains to improvements in gages, and relates more particularly to gages designed for measuring the flow of water passing through a given channel or way or over a weir.

The gage is shown in the annexed drawings, wherein:

Figure 1 represents the inner face of a weir, showing the gage in operative relation therewith; Fig. 2 a sectional view on the line 2—2 of Fig. 1; Fig. 3 a longitudinal sectional view of the gage; Fig. 4 a horizontal sectional view on the line 4—4 of Fig. 3; Fig. 5 a perspective view of the combined packing gland and valve-seat; Fig. 6 a like view of the lower end of the valve-rod and the valve; Fig. 7 a view of the inner face of a weir, showing a modified arrangement or manner of employing the gage; Fig. 8 a longitudinal sectional view of the weir and ditch, showing the gage in its secondary or measuring position; Fig. 9 a face view of the device employed to secure the gage upon the straight-edge; Fig. 10 a top plan view thereof; and Fig. 11 a perspective view of the weight employed to hold the lower end of the pipe in its proper position.

This case, except in so far as the weight employed to hold the tube in position is concerned, is a continuation of my application filed on or about the 12th day of February, 1907, Serial No. 357,034, to which reference is made.

The object of the invention is to provide an instrument whereby the flow or volume of water passing through a channel or ditch or over the crest of a weir may be accurately ascertained.

The increasing use of water for irrigation purposes renders it necessary to accurately determine the amount of water which passes through the ditch. The gage shown in the annexed drawings affords a simple and highly efficient means whereby such measurement may be made even though the instrument be placed in the hands of an unskilled user.

The gage tube shown in the accompanying drawings is the same throughout, though two methods of employing the tube are illustrated.

Referring first to the construction illustrated in Figs. 1 to 6 inclusive, A denotes the crest of a Cippoletti weir, and B, B blocks or cleats secured to the inner face thereof, the upper edges of the cleats standing in alinement with the weir-crest.

The gage comprises an outer shell or casing C, preferably of brass, and provided with a longitudinally-disposed sight-opening D. Within said shell is mounted a glass tube E, the shell at its lower end resting upon an inwardly-projecting shoulder formed upon the interior of a body piece or coupling F, while the tube extends downwardly into the same. The body piece is threaded internally and provided with an inclined face G.

The combined valve-seat and packing-gland is designated by H, see Fig. 5, said member being exteriorly threaded and provided with an upper inclined edge, and with a central polygonal opening. Suitable packing is interposed between the gland and the inclined face G, and, as the gland is screwed up into the body piece, the packing is formed inwardly against the glass tube, thus effecting a tight joint between the tube and the adjacent parts.

I denotes the valve-stem carrying at its lower end a cup J in which is seated the valve K. As will be seen upon reference to Figs. 3, 4 and 6, the valve-stem at its lower part is provided with a fin or rib L which, when the parts are assembled, takes into one of the angles of the opening in the member H, and thus prevents the valve-stem from turning. The stem being circular in cross-section and the opening polygonal, a space is afforded through which the water may pass when the valve is not drawn to its seat. The upper end of the stem is threaded and passes freely through a cap-piece M, and a thumb-nut N is mounted upon such threaded portion, and serves when rotated to raise or lower the stem and its valve.

A valve-shell or cup-shaped member O is screwed into the lower end of the body piece F, and a short pipe or nipple P extends outwardly therefrom, said nipple serving as a means of connection for a longer pipe Q, preferably a flexible one. Member O forms a chamber through which the water from pipe Q passes and likewise forms a housing for the valve. A weight Q', shown in detail in Fig. 11, is secured to the outer or free end of the pipe Q, said weight being provided with a series of connected openings which are in communication with the pipe. This weight, or its equivalent, will keep the free end of the pipe under water.

Extending outwardly from the body piece F is a flange or rim R, which serves as a rest for the gage when brought into position with relation to the blocks B. Said flange also serves as a fixed zero mark, the shell C being graduated therefrom, preferably upon each side of the opening D, as best indicated in Fig. 3, the graduation upon one side being preferably in inches and upon the opposite side in hundredths of feet.

As the water passing over the crest of a weir falls away, as shown in Fig. 2, it becomes necessary when an accurate measurement is to be taken that the true water-level be determined and that the water should rise in the gage-tube to that point. To secure this, the flange R is placed upon the upper face of block B, or it might be placed upon the weir-crest, were it not for the evident inconvenience of so positioning the same, and the tube or pipe Q turned up-stream, the mouth of the pipe opening at a point in the stream where it is of full depth and unaffected by the falling-away over the weir-crest. The water will, of course, rise in the gage to the exact level, since it is not influenced by slight waves due to the wind or other causes. When the water has thus passed into the gage, the valve K is drawn to its seat and the gage removed for reading and comparison with suitable tables.

In Figs. 7 and 8 I have illustrated the gage as being used in connection with a straight-edge, as in Letters Patent granted to me under date of March 12, 1907, No. 846,669, in which such combination is claimed generically.

The straight-edge, designated by S, has secured to one face thereof a block T, having a section U cut out and hinged thereto. A seat, preferably lined with a soft material, as felt, is formed in the block and hinged section, said section when secured in place by a turn-button V, acting to clamp and hold the gage-tube in its adjusted position. When used with the straight-edge the flexible tube may be omitted, if desired. The straight-edge will preferably be provided with a fixed level as W, so adjusted as to make a level of such straight-edge, and when it is desired to take a measurement the flange R is placed upon the weir-crest A, the straight-edge resting in a level position on the top of the weir. When thus positioned block U is locked in place and the gage-tube clamped. The straight-edge is then turned up-stream, one end resting on the weir and the other upon a wedge seated upon a stake or other support. After the straight-edge is properly leveled and the water has passed into the gage, the valve is closed and the gage withdrawn from the ditch for the purpose of accurately reading the depth of water in the tube.

It will be appreciated that by having a fixed zero-point, to wit, the flange R, there can be no change in the scale, as would be the case if the valve were located exteriorly of the tube, as in my patent referred to above. While such tube did afford accurate measurements, still if the valve were screwed up too tight the initial measurement would be thrown out just that much. Under the present construction the scale and valve are entirely independent of each other.

It is conceivable that, in so far as the generic invention is concerned, the particular construction of the gage-tube is immaterial. So, too, the gage may be employed in connection with any form of weir.

Having thus described my invention, what I claim is:

1. A portable gage-tube adapted to be placed in juxtaposition to a weir or the like for measuring the water passing over the same, said tube having an opening in the lower end thereof for the admission of the water; a pipe adapted, when in use, to be extended up-stream from the weir, said pipe communicating at one end with the opening in the tube, the opposite end of the pipe being open to permit the free entrance of water into said pipe at a point distant from the weir; and a valve for closing communication between the pipe and the tube.

2. A portable gage-tube adapted to be placed in juxtaposition to a weir or the like for measuring the water passing over the same, said tube having an opening in the lower end thereof for the admission of the water; a flexible pipe adapted, when in use, to be extended up-stream from the weir, said pipe communicating at one end with the opening in the tube, the free end of the pipe being open to permit the ready entrance of water thereto at a point distant from the weir; and a valve for closing communication between the pipe and the tube.

3. A portable gage-tube adapted to be placed in juxtaposition to a weir or the like for measuring the water passing over the same, said tube having an opening in the lower end thereof; a pipe communicating at one end with said opening, extending laterally therefrom and opening at its other end at a point remote from the tube and, when in use, from the weir; and a valve for holding any water which may pass into the tube through said pipe.

4. A portable gage-tube adapted to be placed in juxtaposition to a weir or the like for measuring the water passing over the same, said tube having an opening in the lower portion thereof for the admission of the water; a valve-seat in the tube at a point above the opening; a valve for opening and closing a port formed in said seat; and an open-ended pipe extending outwardly from the opening in the tube and, when in use, to a point distant from the weir and communicating with the tube through such opening.

5. In combination with a gage-tube having a chamber at its lower end; a valve-seat located adjacent to the lower end of the tube; a valve for closing the port in said seat; a valve-stem extending upwardly through the tube; means located at the upper end of the stem for raising and lowering the same; and a pipe extending outwardly from the tube and communicating with the chamber at a point below the valve-seat.

6. In combination with a gage-tube having a valve-chamber formed at its lower end; a valve-seat located in the upper portion of the chamber; a valve located in said chamber; a valve-stem secured to the valve and extending upwardly through the tube; means for raising and lowering the stem and valve and holding the valve against the valve-seat; and a pipe extending outwardly from the valve-chamber and communicating therewith.

7. In combination with a shell or casing provided with a longitudinally-disposed sight opening; a glass tube mounted therein; a coupling provided with an internal shoulder upon which the lower end of the shell rests, the tube being longer and passing down into the coupling; a combined valve-seat and packing-gland secured within the coupling and serving to force packing interposed between said gland and the coupling into contact with the tube, said valve-seat being likewise provided with a polygonal port; a valve-stem extending through said port and up through the tube the upper end of the stem being threaded; a rib extending outwardly from the stem and passing into one of the angles of the port; a valve carried by the lower end of the stem; a cup-shaped member secured to the lower end of the coupling; a nipple extending outwardly from said cup-shaped member; a pipe connected to said nipple; a cap-piece mounted upon the upper end of the tube and shell; and a thumb-nut mounted upon the upper threaded end of the valve-stem above the cap-piece.

8. In an instrument for measuring water passing over a weir, the combination of a straight-edge; a block secured thereto; a member hinged to the block; a gage-tube adapted to be clamped between said block and hinged member; and a valve for opening and closing the lower end of the tube.

9. A gage-tube provided with a series of graduations, the tube being adapted to be opened and closed; an outwardly-extending member arranged coincident with the zero-mark of the graduations and forming a rest for the device; a valve located in the lower end of the tube below the zero-mark; and means for operating said valve from a point adjacent to the upper end of the tube.

10. A portable gage-tube adapted to be placed in juxtaposition to a weir or the like for measuring the water passing over the same, said tube having an opening in the lower end thereof; a pipe adapted, when in use, to be extended up-stream from the weir, said pipe communicating at one end with the opening, the opposite end of the pipe being open to permit the free entrance of water into said pipe from the point up-stream; means for holding the free end of said pipe in proper position with reference to the channel or way through which the water is passing; and a valve for closing communication between the pipe and the tube.

11. A gage-tube for measuring the water passing over a weir or the like, said tube having an opening in the lower end thereof; a flexible pipe communicating at one end with the opening and extending away from the tube, the free end of the pipe being open to permit the ready entrance of water thereto; a weight connected to the outer end of the pipe; and a valve for closing communication between the pipe and tube.

12. A gage-tube for measuring the water passing over a weir or the like, said tube having an opening in the lower end thereof; a flexible pipe communicating at one end with the opening and extending away from the tube; a perforate weight secured to the free end of the tube, the perforations in the weight being in communication with the tube; and a valve for closing communication between the pipe and tube.

In testimony whereof I have signed my name to this specification in the presence of two subscribing witnesses.

EDWARD B. HOWELL.

Witnesses:
    INEZ F. HARDING,
    WILLIAM F. DAVIS.

It is hereby certified that in Letters Patent No. 963,150, granted July 5, 1910, upon the application of Edward B. Howell, of Butte, Montana, for an improvement in "Gages," an error appears in the printed specification requiring correction as follows: Page 1, line 84, the word "formed" should read *forced;* and that the said Letters Patent should be read with this correction therein that the same may conform to the record of the case in the Patent Office.

Signed and sealed this 26th day of July, A. D., 1910.

[SEAL.]

F. A. TENNANT,
*Acting Commissioner of Patents.*